(12) United States Patent
Do et al.

(10) Patent No.: US 10,633,604 B2
(45) Date of Patent: Apr. 28, 2020

(54) PROCESS FOR USING IRON AND MOLYBDENUM CATALYST FOR SLURRY HYDROCRACKING

(71) Applicant: UOP LLC, Des Plaines, IL (US)

(72) Inventors: Phuong T. M. Do, Des Plaines, IL (US); Alakananda Bhattacharyya, Glen Ellyn, IL (US); Beckay J. Mezza, Arlington Heights, IL (US); Stephen C. Houdek, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/796,697

(22) Filed: Oct. 27, 2017

(65) Prior Publication Data

US 2018/0051218 A1 Feb. 22, 2018

Related U.S. Application Data

(63) Continuation of application No. PCT/US2016/053921, filed on Sep. 27, 2016.
(Continued)

(51) Int. Cl.
*C10G 47/12* (2006.01)
*B01J 37/08* (2006.01)
*B01J 23/881* (2006.01)
*B01J 23/28* (2006.01)
*B01J 23/745* (2006.01)
(Continued)

(52) U.S. Cl.
CPC ............ *C10G 47/12* (2013.01); *B01J 23/28* (2013.01); *B01J 23/745* (2013.01); *B01J 23/881* (2013.01); *B01J 23/8872* (2013.01); *B01J 27/19* (2013.01); *B01J 37/08* (2013.01); *C10G 47/04* (2013.01); *C10G 2300/1077* (2013.01); *C10G 2400/02* (2013.01); *C10G 2400/04* (2013.01)

(58) Field of Classification Search
CPC ............ C10G 47/12; C10G 2300/1077; B01J 23/881; B01J 23/745; B01J 23/28; B01J 27/19; B01J 23/8872; B01J 37/08
See application file for complete search history.

(56) References Cited

U.S. PATENT DOCUMENTS 4,169,041 A * 9/1979 Schuette ................. C10B 55/10
208/108
4,525,267 A 6/1985 Inooka
(Continued)

FOREIGN PATENT DOCUMENTS

CA 2426374 A1 11/2003

OTHER PUBLICATIONS

Search Report dated Jan. 12, 2017 for corresponding PCT Appl. No. PCT/US2016/053921.
(Continued)

*Primary Examiner* — Randy Boyer
*Assistant Examiner* — Juan C Valencia
(74) *Attorney, Agent, or Firm* — Paschall & Associates, LLC; James C. Paschall (57) ABSTRACT

A process and catalyst is disclosed for converting heavy hydrocarbon feed into lighter hydrocarbon products using multifunctional catalysts. Multifunctional catalysts enable use of less expensive metal by substituting expensive metals for less expensive metals with no loss or superior performance in slurry hydrocracking. Less available and expensive ISM can be replaced effectively.

17 Claims, 1 Drawing Sheet

Related U.S. Application Data (60) Provisional application No. 62/235,292, filed on Sep. 30, 2015.

(51) Int. Cl.
*C10G 47/04* (2006.01)
*B01J 23/887* (2006.01)
*B01J 27/19* (2006.01)

(56) References Cited

U.S. PATENT DOCUMENTS

| | | |
|---|---|---|
| 4,923,838 A | 5/1990 | Khulbe |
| 4,969,988 A | 11/1990 | Jain et al. |
| 5,755,955 A | 5/1998 | Benham et al. |
| 6,797,153 B1 | 9/2004 | Fukuyama |
| 8,123,933 B2 | 2/2012 | Bhattacharyya et al. |
| 2011/0306490 A1* | 12/2011 | Bhattacharyya ......... B01J 21/04 |
| | | 502/220 |
| 2013/0075303 A1 | 3/2013 | Heraud |
| 2013/0150637 A1* | 6/2013 | Borremans .......... B01J 31/2295 |
| | | 585/241 |

OTHER PUBLICATIONS

U.S. Appl. No. 15/789,926, filed Oct. 20, 2017.
U.S. Appl. No. 15/789,931, filed Oct. 20, 2017.
U.S. Appl. No. 15/796,702, filed Oct. 27, 2017.
Smith, "The Combustion Rates of Coal Chars: A Review", "Ninenteenth Symposium", Apr. 5, 2019, pp. 1045-1065, vol. 1982, Publisher: The Combustion Institute, Published in: North Ryde, Australia.

* cited by examiner

PROCESS FOR USING IRON AND MOLYBDENUM CATALYST FOR SLURRY HYDROCRACKING

CROSS-REFERENCE TO RELATED APPLICATIONS

This application is a Continuation of copending International Application No. PCT/US2016/053921 filed Sep. 27, 2016 which application claims benefit of U.S. Provisional Application No. 62/235,292 filed Sep. 30, 2015, the contents of which cited applications are hereby incorporated by reference in their entirety.

BACKGROUND

This field relates to a process and apparatus for the treatment of crude oils and, more particularly, to the hydroconversion of heavy hydrocarbons in the presence of additives and catalysts to provide useable products and further prepare feedstock for further refining.

As the reserves of conventional crude oils decline, heavy oils must be upgraded to meet world demands. In heavy oil upgrading, heavier materials are converted to lighter fractions and most of the sulfur, nitrogen and metals must be removed. Heavy oils contain a large portion of material boiling above 524° C. (or 975° F.) or higher. These heavy hydrocarbon feedstocks may be characterized by low reactivity in visbreaking, high coking tendency, poor susceptibility to hydrocracking and difficulties in distillation. Most residual oil feedstocks which are to be upgraded contain some level of asphaltenes which are typically understood to be heptane insoluble and toluene soluble compounds as determined by ASTM D3279 or ASTM D6560. Asphaltenes are high molecular weight compounds containing heteroatoms which impart polarity.

Heavy oils must be upgraded in a primary upgrading unit before it can be further processed into useable products. Primary upgrading units known in the art include, but are not restricted to, coking processes, such as delayed or fluidized coking, and hydrogen addition processes such as ebullated bed or slurry hydrocracking (SHC). As an example, the yield of liquid products, at room temperature, from the coking of some Canadian bitumens is typically about 55 to 60 wt % with substantial amounts of coke as by-product. On similar feeds, ebullated bed hydrocracking typically produces liquid yields of 50 to 55 wt %. Ebullated bed hydrocracking uses catalyst, typically extruded pellets, as big as 1 mm in size. U.S. Pat. No. 5,755,955 describes an SHC process which has been found to provide liquid yields of 75 to 80 wt % with much reduced coke formation through the use of additives.

In SHC, a three-phase mixture of heavy liquid oil feed cracks in the presence of gaseous hydrogen over solid catalyst to produce lighter products under pressure at an elevated temperature. Iron sulfate has been disclosed as an SHC catalyst, for example, in U.S. Pat. No. 5,755,955. Iron sulfate monohydrate (ISM) is typically ground down to smaller size for better dispersion and facilitation of mass transfer. Iron sulfate ($FeSO_4$) usually requires careful thermal treatment in air to remove water from hydrated iron sulfate which is typically provided in a mono or heptahydrated form. Water can inhibit conversion of $FeSO_4$ to iron sulfide and typically must be removed. Treatment with sulfur-containing compounds such as hydrogen sulfide converts the iron in iron sulfate to the catalytically active species, iron sulfide. The sulfur from iron sulfate contributes to the sulfur in the product that has to be removed. Other iron containing catalysts such as limonite, which contains $FeO(OH).nH_2O$, require presulfiding treatment for better dispersion and conversion of the iron oxide to the active iron sulfide according to CA 2,426,374. Presulfiding treatment adds sulfur to the catalyst and consequently to the heavy hydrocarbon being processed. As such, extra sulfur must usually be removed from the product. The active iron is in the +2 oxidation state in the iron sulfide catalyst which is required to obtain adequate conversion and selectivity to higher value products and to avoid excessive coke formation. ISM is expensive and may not be sufficiently available to catalyze all of the SHC units the world may need to upgrade heavy oil. Other minerals such as bauxite have been shown to be an excellent SHC catalyst for example in U.S. Pat. No. 8,123,933 B2.

During an SHC reaction, it is important to minimize coking. It has been shown by the model of Pfeiffer and Saal, PHYS. CHEM. 44, 139 (1940), that asphaltenes are surrounded by a layer of resins, or polar aromatics which stabilize them in colloidal suspension. In the absence of polar aromatics, or if polar aromatics are diluted by paraffinic molecules or are converted to lighter paraffinic and aromatic materials, these asphaltenes can self-associate, or flocculate to form larger molecules, generating a mesophase particle or sphere and precipitating out of solution to ultimately form coke.

Toluene can be used as a solvent to dissolve and separate carbonaceous solids from lighter hydrocarbons in the SHC product. The solids not dissolved by toluene include catalyst and toluene insoluble organic residue (TIOR). TIOR includes coke and mesophase and is heavier and less soluble than asphaltenes which are insoluble in heptanes, but soluble in toluene. Mesophase formation is a critical reaction constraint in slurry hydrocracking reactions. Mesophase is a semi-crystalline carbonaceous material defined as round, anisotropic particles present in pitch boiling above 524° C. The presence of mesophase can serve as a warning that operating conditions are too severe in an SHC reactor and that coke formation is likely to occur under prevailing conditions.

Due to the anticipated demand for SHC operations to upgrade heavy oil, greater supplies of effective catalyst will become necessarily desirable.

SUMMARY

A process embodiment comprises a process for converting heavy hydrocarbon feed into lighter hydrocarbon products comprising mixing the heavy hydrocarbon liquid feed with molybdenum, iron particles and hydrogen to form a heavy hydrocarbon slurry comprising hydrocarbon liquid and catalyst particles. The hydrocarbons in the heavy hydrocarbon slurry are hydrocracked in the presence of hydrogen and catalyst in a hydrocracking reactor to produce a hydrocracked slurry product comprising lighter hydrocarbon products. The hydrocracked slurry product is withdrawn from the hydrocracking reactor.

An additional process embodiment further comprises a process wherein the molybdenum is oil soluble and the iron particles comprise aluminum.

A further process embodiment comprises a process wherein the molybdenum is oil soluble and the iron particles comprise mean particle diameters of no more than 800 microns.

BRIEF DESCRIPTION OF THE DRAWING

For a better understanding, reference is made to the accompanying drawing.

DEFINITIONS

Figure 1:
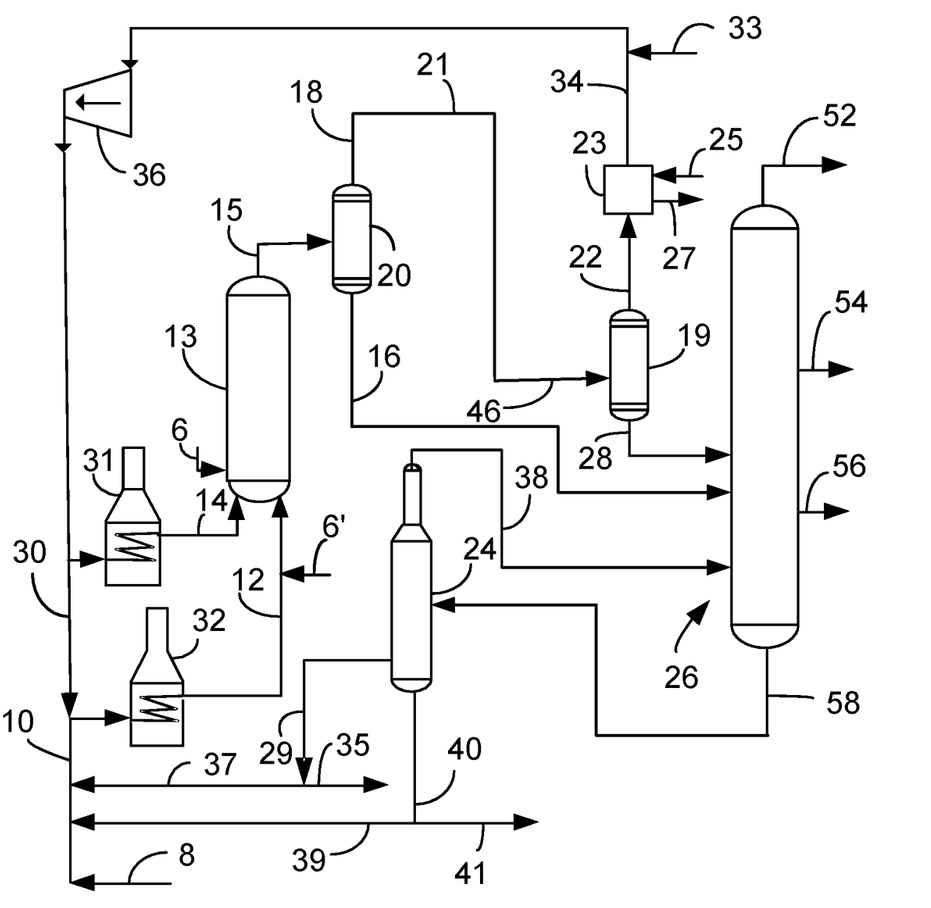
The FIGURE is a schematic flow scheme for an SHC plant.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, "pitch" means the hydrocarbon material boiling above about 524° C. (975° F.) AEBP as determined by any standard gas chromatographic simulated distillation method such as ASTM D2887, D6352 or D7169, all of which are used by the petroleum industry.

As used herein, the term "T5" or "T95" means the temperature at which 5 volume percent or 95 volume percent, as the case may be, respectively, of the sample boils using ASTM D-86.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "diesel boiling range" means hydrocarbons boiling in the range of between about 204° C. (399° F.) and 343° C. (650° F.) using the TBP distillation method.

As used herein, the term "diesel conversion" means conversion of feed that boils above the diesel cut point to material that boils at or below the diesel cut point in the diesel boiling range.

As used herein, "pitch conversion" means the conversion of materials boiling above 524° C. (975° F.) converting to material boiling at or below 524° C. (975° F.).

As used herein, "vacuum gas oil" means the hydrocarbon material boiling in the range between about 343° C. (650° F.) and about 524° C. (975° F.) AEBP as determined by any standard gas chromatographic simulated distillation method such as ASTM D2887, D6352 or D7169, all of which are used by the petroleum industry.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, solvent "insolubles" means materials not dissolving in the solvent named.

As used herein, the term "incipient wetness" means liquid is added to a measured amount of a dried material in drop-wise fashion until a paste is obtained and all of the pores of the solid are filled with no free flowing liquid. The volume of liquid water needed to reach incipient wetness per weight of solid is the aqueous pore volume.

The term "Cx" are to be understood to refer to molecules having the number of carbon atoms represented by the subscript "x". Similarly, the term "Cx−" refers to molecules that contain less than or equal to x and preferably x and less carbon atoms. The term "Cx+" refers to molecules with more than or equal to x and preferably x and more carbon atoms.

DESCRIPTION OF THE PREFERRED EMBODIMENTS

We have found bi-functional catalysts comprising iron particles and molybdenum from various sources can be equal or superior to ISM in terms of conversion to desirable products and limiting the formation of undesirable products or insolubles. The addition of iron particles is effective in assisting molybdenum in the control of mesophase formation, thus allowing the smooth operation in slurry hydrocracking. Iron is also helpful in conversion of heavy hydrocarbon feed to below the pitch boiling point. Iron is less expensive than molybdenum. Replacing some molybdenum with iron enhances the effectiveness of the catalyst while easing the need for molybdenum and reduces catalyst cost. Additionally, less expensive iron particles such as bauxite or red mud can replace more expensive ISM without loss of effectiveness. Since iron is effective in reducing mesophase, we can use a lower concentration of molybdenum in the feed. With iron catalyst, the concentration of molybdenum can be much lower than the concentration of molybdenum alone and maintain the same or better performance.

The process is capable of processing a wide range of heavy hydrocarbon feedstocks. It can process aromatic feedstocks, as well as feedstocks which have traditionally been very difficult to hydroprocess, e.g. atmospheric or vacuum residue, visbroken residue, deasphalted bottom materials, off-specification asphalt, sediment from the bottom of oil storage tanks, tar sands, bitumen, etc. Suitable feeds include atmospheric residue with an IBP above or at about 650° F. (343° C.), heavy vacuum gas oil (VGO) with an IBP above or at about 800° F. (426° C.) and vacuum residue with an IBP above or at about 950° F. (510° C.). Feeds with a T90 greater than or equal to 572° F. (300° C.) will be suitable. Suitable feeds include an API gravity of no more than 20 degrees, typically no more than 10 degrees and may include feeds with less than 5 degrees.

In the exemplary SHC process as shown in the FIGURE, one, two or all of a heavy hydrocarbon oil feed in line 8, a recycle pitch stream containing catalyst particles in line 39, and recycled heavy VGO (HVGO) in line 37 may be combined in line 10. The combined feed in line 10 is heated in the heater 32 and pumped through an inlet line 12 into an inlet in the bottom of the tubular SHC reactor 13. Solid particulate and/or oil soluble catalyst material may be added directly to heavy hydrocarbon oil feed in the SHC reactor 13 from line 6 or may be mixed from line 6' with a heavy hydrocarbon oil feed in line 12 before entering the reactor 13 to form a slurry in the reactor 13. Several catalyst mixing lines 6, 6' may be used. It is not necessary and may be disadvantageous to add the catalyst upstream of the heater 32. It is possible that in the heater, metal particles may sinter or agglomerate to make larger metal particles, which is to be avoided. Many mixing and pumping arrangements may be suitable. It is also contemplated that feed streams may be added separately to the SHC reactor 13. Recycled hydrogen and make up hydrogen from line 30 are fed into the SHC reactor 13 through line 14 after undergoing heating in heater 31. The hydrogen in line 14 that is not premixed with feed may be added at a location above the feed entry in line 12. Both feed from line 12 and hydrogen in line 14 may be distributed in the SHC reactor 13 with an appropriate distributor. Additionally, hydrogen may be added to the feed in line 10 before it is heated in heater 32 and delivered to the SHC reactor in line 12. Preferably the recycled pitch stream in line 39 makes up in the range of about 5 to 15 wt % of the feedstock to the SHC reactor 13, while the HVGO in line 37 makes up in the range of 5 to 50 wt % of the feedstock, depending upon the quality of the feedstock and the once-through conversion level. The feed entering the SHC reactor 13 comprises three phases, solid catalyst particles, liquid and solid hydrocarbon feed and gaseous hydrogen and vaporized hydrocarbon.

The process can be operated at quite moderate pressure, in the range of 3.5 to 24 MPa (500 to 3500 psig) and preferably in the range of 10.3 to 17.2 MPa (1500 to 2500 psig), without coke formation in the SHC reactor 13 with the appropriate catalyst. The reactor temperature is typically in the range of about 400 to about 500° C. with a temperature of about 440 to about 465° C. being suitable and a range of 445 to 460° C. being preferred. The LHSV is typically below about 4 $h^{-1}$ on a fresh feed basis, with a range of about 0.1 to 3 $h^{-1}$ being preferred and a range of about 0.3 to 1 $h^{-1}$ being particularly preferred. Although SHC can be carried out in a variety of known reactors of either up or downflow, it is particularly well suited to a tubular reactor through which feed, catalyst and gas move upwardly. Hence, the outlet from SHC reactor 13 is above the inlet. Although only one is shown in the FIGURE, one or more SHC reactors 13 may be utilized in parallel or in series. Because the liquid feed is converted to vaporous product, foaming tends to occur in the SHC reactor 13. An antifoaming agent may also be added to the SHC reactor 13, preferably to the top thereof, to reduce the tendency to generate foam. Suitable antifoaming agents include silicones as disclosed in U.S. Pat. No. 4,969,988.

A gas-liquid mixture is withdrawn from the top of the SHC reactor 13 through line 15 and separated preferably in a hot, high-pressure separator 20 kept at a separation temperature between about 200 and 470° C. (392 and 878° F.) and preferably at about the pressure of the SHC reactor. In the hot separator 20, the effluent from the SHC reactor 13 is separated into a gaseous stream 18 and a liquid stream 16. The liquid stream 16 contains HVGO. The gaseous stream 18 comprises between about 35 and 80 vol-% of the hydrocarbon product from the SHC reactor 13 and is further processed to recover hydrocarbons and hydrogen for recycle.

A liquid portion of the product from the hot separator 20 may be further separated at lower temperature and/or stripped to provide a hot slurry hydrocracked liquid effluent in line 16 to the product fractionation column 26.

The gaseous stream in line 18 may be passed to a cold high pressure separator 19. Within the cool separator 19, the product is separated into a gaseous stream rich in hydrogen which is drawn off through the overhead in line 22 and a liquid hydrocarbon product which is drawn off the bottom through line 28. The hydrogen-rich stream 22 may be passed through a packed scrubbing tower 23 where it is scrubbed by means of a scrubbing liquid in line 25 to remove hydrogen sulfide and ammonia. The spent scrubbing liquid in line 27 may be regenerated and recycled and is usually an amine. The scrubbed hydrogen-rich stream emerges from the scrubber via line 34 and is combined with fresh make-up hydrogen added through line 33 and recycled through a recycle gas compressor 36 and line 30 back to reactor 13. The bottoms line 28 may carry cold liquid slurry hydrocracked product to a further low pressure flash drum and/or a stripper before feeding a cold slurry hydrocracked liquid effluent to the product fractionator 26.

The product fractionator 26 may comprise one or several vessels although it is shown only as one in the FIGURE. The product fractionator produces a $C_4$— recovered in overhead line 52, a naphtha product stream in line 54, a diesel stream in line 56 and a VGO/pitch stream in bottoms line 58.

The bottoms line 58 may carry the VGO/pitch stream in bottoms line 58 to a liquid vacuum fractionation column 24 maintained at a pressure between about 0.25 and 1.5 psi (1.7 and 10.0 kPa) and at a vacuum distillation temperature resulting in an atmospheric equivalent cut point between light VGO and heavy VGO of between about 250° and 500° C. (482° and 932° F.). Three fractions may be separated in the liquid fractionation column: an overhead fraction of light VGO in an overhead line 38 which may be further processed or recycled through line 38 back to the product fractionation column 26, a HVGO stream from a side cut in line 29 and a pitch stream obtained in a bottoms line 40 which typically boils above 450° C. At least a portion of this pitch stream may be recycled back in line 39 to form part of the feed slurry to the SHC reactor 13. Remaining catalyst particles from SHC reactor 13 will be present in the pitch stream and may be conveniently recycled back to the SHC reactor 13. Any remaining portion of the pitch stream is recovered in line 41.

During the SHC reaction, it is important to minimize coking. Adding a lower polarity aromatic oil to the feedstock reduces coke production. The polar aromatic material may come from a portion of the HVGO in line 29 recycled by line 37 to form part of the feed slurry to the SHC reactor 13. The remaining portion of the HVGO may be recovered in line 35.

The catalyst of the present invention comprises molybdenum and iron particles. The molybdenum may be added as a liquid, and the iron particles and the molybdenum may be separately added to the hydrocarbon feed. The iron particles may be provided from iron sulfate such as in hydrated form as iron sulfur monohydrate, bauxite, red mud which is alumina depleted bauxite, limonite, laterite, etc. The iron particles may be from iron salts like iron nitrates, iron halides, iron acetates, iron carboxylates, and the like.

The iron particles may comprise between about 10, preferably about 20, and about 90 wt % iron oxide and between about 10 and about 90 wt %, preferably no more than about 80 wt %, alumina. Iron-containing bauxite is a preferred bulk available mineral having these proportions. Bauxite typically has about 10 to about 40 wt % iron oxide, $Fe_2O_3$, and about 54 to about 84 wt % alumina and may have about 10 to about 35 wt % iron oxide and about 55 to about 80 wt % alumina. Bauxite also may comprise silica, $SiO_2$, and titania, $TiO_2$, in aggregate amounts of usually no more than 10 wt % and typically in aggregate amounts of no more than 6 wt %. Iron is present in bauxite as iron oxide and aluminum is present in bauxite as alumina.

Red mud which comprises bauxite with much of the alumina extracted will have a larger proportion of iron and a lower proportion of alumina such as about 3 to about 30 wt % alumina and preferably about 25 to about 90 wt-% iron oxide and preferably between about 35 and about 60 wt % iron oxide. Calcium oxide may be present in red mud in about 1 to about 40 wt % and preferably between about 1 to about 10 wt %. Volatiles such as water and carbon dioxide are also present in bulk available minerals, but the foregoing weight proportions exclude the volatiles. Iron oxide is also present in bauxite in a hydrated form, $Fe_2O_3 \cdot nH_2O$. Again, the foregoing proportions exclude the water in the hydrated composition. A preferred red mud has a small proportion of micropores that have diameters smaller than 75 angstroms such as under 10% and preferably under 5%.

Alumina may be present in the iron particles in several forms including alpha, gamma, theta, boehmite, pseudo-boehmite, gibbsite, diaspore, bayerite, nordstrandite and corundum. Alumina can be provided in the catalyst by derivatives such as spinels and perovskites. Suitable iron particles can be provided as bauxite available from Saint-Gobain Norpro in Stow, Ohio who may provide it air dried and ground, but these treatments may not be necessary for suitable performance as an iron particle.

Iron particles are more effective if they are not first subjected to a thermal treatment or a sulfide treatment. Water does not impede formation of active iron sulfide from iron oxide in bauxite, so it is not required to remove water by the thermal or any other drying treatment. The water on the iron particle can be either chemically bound to the iron oxide, alumina or other components of the iron particle or be physically bound to the iron particle. The iron in iron oxide in the presence of alumina such as in bauxite quickly converts to active iron sulfide without the need for presenting excess sulfur to the catalyst in the presence of heavy hydrocarbon feed and hydrogen at high temperature as required for other SHC catalysts before addition to the reaction zone.

The activated iron sulfide in the iron particle has several molecular forms, so is generally represented by the formula, $Fe_xS$, where x is between 0.7 and 1.3. We have found that essentially all of the iron oxide in bauxite converts to iron sulfide upon heating the mixture of hydrocarbon and catalyst to 410° C. in the presence of hydrogen and sulfur. In this context, "essentially all" means no peak for iron oxide is generated on an XRD plot of intensity vs. two theta degrees at 33.1 two theta degrees or no less than 99 wt % conversion to iron sulfide. Sulfur may be present in the hydrocarbon feed as organic sulfur compounds. Consequently, the iron in the particle may be added to the heavy hydrocarbon feed in the +3 oxidation state, preferably as $Fe_2O_3$. Iron particles may also comprise iron sulfate monohydrate or heptahydrate. Hydrated iron sulfate is typically ground down to smaller size for better dispersion and facilitation of mass transfer. Particle size may be less than 45 microns and with at least 50 wt % having particle diameter less than 10 microns. Iron sulfate ($FeSO_4$) usually requires careful thermal treatment in air to remove water from iron sulfate which is typically provided in a hydrated form. Other iron containing catalysts such as limonite may be used $FeO(OH) \cdot nH_2O$ but may require presulfiding treatment for conversion of the iron oxide to the active iron sulfide. The active iron in the +2 oxidation state in the iron sulfide catalyst is required to obtain adequate conversion and selectivity to useful liquids and to avoid higher coke formation.

We have found that when molybdenum is added to the feed, iron may be present in the feed in less than 0.7 wt %. When the iron is provided in bauxite particles or alumina is added with iron particles and molybdenum is added to the feed, the iron content may be less than 0.4 wt % and preferably less than 0.1 wt % of the feed and still provide sufficient conversion and suppression of mesophase production. Preferably, the iron particles may comprise no less than 0.05 wt % of the feed to which molybdenum is added. Sufficient mesophase suppression is provided preferably when the yield of mesophase in the product is no more than about 1.0 wt % and preferably no more than about 0.5 wt % of the feed based on rotational polarized light microscopy (RPLM) or x-ray diffraction (XRD). When aluminum is present in the iron particles, the aluminum in the feed that includes molybdenum may be no more than 0.7 wt % and preferably no less than 0.1 wt % of the feed.

The molybdenum may be provided as an organic molybdenum such as molybdenum octoate or molybdenum dithiocarbamate which because it is oil or hydrocarbon soluble may be added directly to the hydrocarbon feed separately from or with the carbon particles. Organic molybdenum may be obtained from R.T. Vanderbilt Holding Company, Inc. of Norwalk, Conn. as molybdenum di-(2-ethylhexyl)-phosphorodithioate in oil under the trade name Molyvan L. Phosphomolybdates and ammonium heptamolybdate may be other suitable sources of molybdenum. The molybdenum may react with sulfur provided in the hydrocarbon feed or in an additive to produce molybdenum sulfide in the reactor which is the active form of the molybdenum catalyst.

Due to help from other catalyst, the concentration of the molybdenum in the catalyst may be no more than about 500 wppm in the hydrocarbon feed, suitably no more than about 200 wppm in the hydrocarbon feed and typically no more than about 175 wppm in the feed. In some cases, the concentration of molybdenum may be no more than 100 wppm in the feed and preferably not more than 50 wppm of the feed due to help from other catalyst.

EXAMPLES

Example 1

An Urals vacuum residue having a characterization in Table 1 was used to test the catalyst.

TABLE 1

| | |
|---|---|
| Density, g/cm$^3$ | 1.013 |
| Sulfur, wt % | 2.89 |
| Carbon, wt % | 83.1 |
| Hydrogen, wt % | 10.2 |
| Nitrogen, wt % | 0.34 |
| Heptane Insolubles, wt % | 5.78 |
| Carbon Residue, wt % | 17.9 |
| Pentane Insolubles, wt % | 10 |
| Toluene Insolubles, wt % | 0.4 |

Testing was conducted to examine activity of the catalysts. The reactors used to rank catalysts in the heavy oil research activity were batch autoclaves. Five hundred grams of Urals vacuum residues were charged to the autoclave. The catalyst components were added to the feed separately. The catalyst mixture and sulfur additive, if used, were then charged to the autoclave reactor and mixing was started at 300 rpm. Hydrogen was brought online to the reactor. Mixer speed was then increased to 1000 rpm, the band heater temperature set point was raised to 450° C., and the reactor pressure was brought to the operating pressure. Flow was commenced at 6.5 sl/min. of hydrogen. The experiment was considered to have begun once liquid temperature reached 450° C. The experiment was held at temperature and pressure with mixing for either 80, 100 or 120 minutes. The experiment was terminated by turning off all heaters, reducing mixing rate to 300 rpm, and bringing cooling water online into the reactor jacket. The plant was cooled from 450° C. to 100° C. in 15 minutes and then was de-pressured. Plant was then re-pressured to 1.4 MPa (gauge) (200 psig) with nitrogen and the knock-out pots were emptied with the aid of the plant pressure. Plant was again de-pressured and reactor contents were unloaded.

Reactor material was diluted with toluene and filtered through 7-10 um paper in a Buchner funnel. Filtered solid was washed until filtrate was transparent, but not colorless. Filtrates were combined and concentrated under vacuum on a rotary evaporator at 45° C. until nearly solvent free. Temperature was then raised to 75° C. for 1 hour after which the material was weighed and sent for analytical testing. The liquid product material was then weighed and sent for analytical testing. The knock-out pot material was isolated from any entrained water and both weights were recorded. The knock-out pot organic component was then sent for analytical testing.

The toluene-insoluble (TI) solids remaining on the filter paper were then dried in the vacuum oven at 100° C. for 24 hours prior to Soxhlet extraction at 110° C. for 6 hours in toluene solvent to remove additional toluene-soluble organic material. The Soxhlet extracted TI solids were dried in the vacuum oven at 100° C. for 24 hours and then subjected to mesophase analysis via RPLM.

Bauxite was obtained from St. Gobain Corp. from Bauxite, Ark., and Cajunite Red Mud was obtained from Kaiser Aluminum and Chemical Corp. from Baton Rouge, La.

RPLM is the technique used to quantify the mesophase size and amount in the TI solids generated after the heavy oil reactions using ASTM D4616-95. Due to the interference of mesophase patterns and microtexture with accurate measurements in the method, rotating the incident light beam was employed to provide accurate shape and sizes following the teachings of J. Crelling, "Bireflectance Imaging of Coal and Carbon Specimens", INT'L J. COAL GEOLOGY, vol. 64, Issues 3-4, 204-216 (2005). A fully automated bi-reflectance method acquires 183 images randomly on mounted and polished TI samples. The image processing software then generates the mesophase volume-adjusted diameter and concentration, or total bright percent average, from the 183 images. RPLM was performed with 8× and 25× lenses.

Example 2

Red mud sold by Kaiser Aluminum and Chemical Corporation under the trademark Cajunite had the chemical analysis in Table 2. Surface characteristics were determined using the BET methods ASTM D4222 and D4641.

TABLE 2

| Property | |
|---|---|
| LOI at 900° C., mass % | 12.41 |
| Fe | 31.85 |
| Al | 7.07 |
| Ca | 6.59 |
| Na | 1.62 |
| Ti | 3.65 |
| Surface area, m$^2$/g | 49 |
| Pore volume, cc/g | 0.207 |
| Average pore diameter, A | 200 |
| Micropore area, m$^2$/g | 11 |
| Micropore volume, cc/g | 0.005 |
| Micropore proportion, % | 2.4 |

Most of the pores were larger than the micropore range, greater than 70 A, and had pores greater than 100 A.

The Urals vacuum residue feed in Table 1 was reacted over Cajunite red mud in Table 2 with and without molybdenum from oil soluble Molyvan L from Vanderbilt Chemicals, LLC and over the same molybdenum without red mud. Reaction conditions included 450° C., 13.8 MPa (gauge) (2000 psig) and 80 minutes on stream. Mesophase was measured using a 25 times lens by the RPLM method to determine mesophase in the TI. Results are given in Table 3.

TABLE 3

| Plant-Run | 523-608 | 523-611 | 523-630 |
|---|---|---|---|
| Mo, wppm | 0 | 36 | 150 |
| Cajunite red mud, wt % | 2.1 | 2.1 | 0 |
| Iron, wt % | 0.67 | 0.67 | 0 |
| Aluminum, wt % | 0.15 | 0.15 | 0 |
| Conversion, wt % pitch | 83.3 | 84.7 | 85.0 |
| H$_2$S, CO, CO$_2$ yield, wt % feed | 2.1 | 2.3 | 2.5 |
| C$_1$-C$_4$ total yield, wt % feed | 7.3 | 6.4 | 7.1 |
| Naphtha (C$_5$-204° C.) yield, wt % feed | 26.9 | 26.3 | 24.3 |
| Diesel (204 C.-343° C.) yield, wt % feed | 28.2 | 28.1 | 27.5 |
| VGO (343 C.-524° C.) yield, wt % feed | 18.5 | 21.7 | 24.6 |
| Pitch (524° C.+) yield, wt % feed | 16.7 | 15.3 | 15.0 |
| TIOR based on ash, wt % feed | 4.8 | 2.8 | 2.01 |
| Mesophase in TI, wt % | 8.3 | 4.0 | 12.1 |
| Mesophase yield, wt % feed | 0.54 | 0.2 | 0.25 |

It can be seen that molybdenum used with the red mud had a synergistic effect that was superior to either red mud or molybdenum by itself. The inexpensive red mud allows the expensive molybdenum to be cut to one-quarter of the weight and still have superior performance.

Example 3

Bauxite sold by St. Gobain had the chemical analysis in Table 4. Particle size distribution may be determined by ASTM D4464. Surface characteristics were determined using the BET methods ASTM D4222 or D4641.

TABLE 4

| Property | Bauxite |
|---|---|
| Fe, wt % | 17.7 |
| Al, wt % | 32.9 |
| Si, wt % | 1.6 |
| Ca, wt % | 0.355 |
| Mn, wt % | 0.409 |
| P, wt % | 0.203 |
| Ti, wt % | 1.88 |
| LOI at 900° C. | 7.61 |
| Median Diameter, microns | 19.4 |
| Mean Diameter, microns | 53.0 |
| 10 | 2.02 |
| 25 | 4.51 |
| 50 | 19.4 |
| 75 | 71.5 |
| 90 | 152 |

The Urals vacuum residue feed in Table 1 was reacted over the bauxite in Table 4 with and without molybdenum from oil soluble molybdenum octanoate from Shepherd Chemical Company in Norwood, Ohio and molybdenum by itself. Reaction conditions included 450° C., 13.8 MPa (gauge) (2000 psig) and 80 and 120 minutes on stream. Mesophase was measured using an 8 times lens using RPLM and is reported as a percentage of TI and mesophase yield. Results are given in Table 5.

TABLE 5

| Plant-Run | 523-809 | 523-820 | 522-861 | 523-789 | 522-784 | 522-796 |
|---|---|---|---|---|---|---|
| Molybdenum, wppm | 0 | 40 | 40 | 0 | 150 | 150 |
| Bauxite, wt % | 0.5 | 0.5 | 0 | 1.9 | 1.9 | 0 |
| Iron, wt % | 0.09 | 0.09 | 0 | 0.33 | 0.33 | 0 |
| Aluminum, wt % | 0.16 | 0.16 | 0 | 0.63 | 0.63 | 0 |
| Time on stream, min. | 80 | 80 | 80 | 120 | 120 | 120 |
| Conversion, wt % pitch + TIOR | 80.8 | 84.2 | 77.1 | 86.9 | 86.8 | 85.7 |
| $H_2S$, CO, $CO_2$ yield, wt % feed | 2.57 | 2.7 | 3.1 | 2.4 | 3.1 | 2.8 |
| $C_1$-$C_4$ total yield, wt % feed | 6.76 | 6.0 | 9.3 | 6.7 | 5.1 | 5.8 |
| Naphtha ($C_5$-204° C.) yield, wt % feed | 24.0 | 21.2 | 24.0 | 24.3 | 26.2 | 27.4 |
| Diesel (204 C.-343° C.) yield, wt % feed | 27.7 | 28.6 | 25.4 | 30.8 | 30.0 | 29.6 |
| VGO (343 C.-524° C.) yield, wt % feed | 19.8 | 25.7 | 15.3 | 22.7 | 22.3 | 20.1 |
| Pitch (524° C.+) yield, wt % feed | 19.2 | 15.8 | 22.9 | 13.1 | 13.2 | 14.3 |
| TIOR, wt % feed | 5.8 | 2.1 | 11.2 | 2.3 | 2.2 | 2.5 |
| Mesophase in TI, wt % | 5.8 | 4.6 | 14.3 | 2.9 | 1.5 | 3.8 |
| Mesophase yield, wt % feed | 0.37 | 0.13 | 1.61 | 0.13 | 0.06 | 0.09 |

It can be seen that molybdenum used as a catalyst with the bauxite had a synergistic effect that was superior to either bauxite or molybdenum by itself. The inexpensive bauxite enables the molybdenum to further suppress mesophase production while also improving the high value diesel yield.

Example 4

Samples of Cajunite red mud and bauxite from St. Gobain were impregnated with molybdenum to have around 100 wppm molybdenum in the feed to the reactor and compared to catalysts of ISM, bauxite and red mud without molybdenum. Reactor conditions included 450° C., 13.8 MPa (gauge) (2000 psig) and 80 minutes on stream. Mesophase data was calculated using RPLM with a 25× lens. Data is presented in Table 6.

To impregnate iron particles with molybdenum, a solution of 0.46 g molybdenum trioxide ($MoO_3$) and 55 g of ammonium hydroxide (14.8 N solution) was prepared with continuous stirring until the molybdenum trioxide was completely dissolved. Proportions were chosen to obtain 100 wppm molybdenum in the feed. The molybdenum solution was added to 60 g of the iron particles, in this case Cajunite red mud or St. Gobain bauxite, by adding it drop wise to the iron particles while mixing them with a spatula in a mortar. Sufficient solution was dropped on the iron particles to achieve incipient wetness. The molybdenum impregnated iron particles were then ground with a pestle and left in the hood for a couple of hours to dry. An oven was used for overnight drying at 120° C. in nitrogen. To calcine the impregnated particles, a quartz furnace tube was packed, from bottom to top, with alumina spheres, quartz wool, the impregnated particles, quartz wool, and quartz helices. The packed quartz furnace tube was placed in the furnace and calcined at 450° C., with a ramp rate of 0.5° C. per min, for three hours with 400 $scm^3$/min. of air flow. Once the calcination was complete the quartz tube was unpacked to recover the calcined, impregnated particles.

TABLE 6

| | Bauxite | Molybdenum on Bauxite | Red Mud | Molybdenum on Red Mud | ISM |
|---|---|---|---|---|---|
| Plant-Run | 522-576 | 522-661 | 523-608 | 522-658 | 522-757 |
| Mo, wppm | 0 | 95 | 0 | 105 | 0 |
| Bauxite, wt % | 1.9 | 1.9 | 0 | 0 | 0 |
| Red Mud, wt % | 0 | 0 | 2.1 | 2.1 | 0 |
| ISM, wt % | 0 | 0 | 0 | 0 | 2.3 |
| Iron, wt % | 0.33 | 0.33 | 0.67 | 0.67 | 0.67 |
| Conversion, pitch + TIOR, wt % | 85.3 | 85.8 | 82.3 | 81.7 | 83.4 |
| TIOR based on ash, wt % feed | 2.4 | 2.6 | 4.8 | 5.2 | 2.7 |
| Mesophase in TI, wt % | 2.7 | 12.01 | 8.3 | 23.9 | 4.5 |
| Mesophase yield, wt % feed | 0.16 | 0.55 | 0.54 | 1.84 | 0.18 |

Table 6 reveals that impregnated molybdenum on iron particles was less effective than the iron particles themselves and ISM. Consequently, the discovery that iron particles and molybdenum separately provided to the feed was more effective than molybdenum or iron by themselves was surprising.

SPECIFIC EMBODIMENTS

While the following is described in conjunction with specific embodiments, it will be understood that this description is intended to illustrate and not limit the scope of the preceding description and the appended claims.

A first embodiment is a process for converting heavy hydrocarbon feed into lighter hydrocarbon products comprising mixing the heavy hydrocarbon liquid feed with molybdenum, iron particles and hydrogen to form a heavy hydrocarbon slurry comprising hydrocarbon liquid and catalyst particles; hydrocracking hydrocarbons in the heavy hydrocarbon slurry in the presence of hydrogen and catalyst in a hydrocracking reactor to produce a hydrocracked slurry product comprising lighter hydrocarbon products; and withdrawing the hydrocracked slurry product from the hydrocracking reactor. An embodiment is one, any or all of prior embodiments in this paragraph up through the first embodiment in this paragraph wherein the molybdenum is in an oil soluble form and is mixed with the hydrocarbon liquid feed. An embodiment is one, any or all of prior embodiments in this paragraph up through the first embodiment in this paragraph wherein the molybdenum is provided as molybdenum sulfide in the hydrocracking reactor. An embodiment is one, any or all of prior embodiments in this paragraph up through the first embodiment in this paragraph wherein the molybdenum in the catalyst is no more than about 200 wppm in the feed. An embodiment is one, any or all of prior embodiments in this paragraph up through the first embodiment in this paragraph wherein the iron is provided as bauxite, red mud, iron sulfate, limonite, iron salt or laterite particles. An embodiment is one, any or all of prior embodiments in this paragraph up through the first embodiment in this paragraph wherein the iron in the iron particles is no more than about 0.7 wt % in the feed. An embodiment is one, any or all of prior embodiments in this paragraph up through the first embodiment in this paragraph wherein the iron particles comprise aluminum and the aluminum in the iron particles is no more than about 0.7 wt % in the feed. An embodiment is one, any or all of prior embodiments in this paragraph up through the first embodiment in this paragraph wherein the iron in the iron particles comprise no less than 0.4 wt % of the feed. An embodiment is one, any or all of prior embodiments in this paragraph up through the first embodiment in this paragraph wherein the molybdenum is no more than about 175 wppm in the feed. An embodiment is one, any or all of prior embodiments in this paragraph up through the first embodiment in this paragraph wherein the yield of TIOR in the product is no more than about 3.0 wt % of the feed. An embodiment is one, any or all of prior embodiments in this paragraph up through the first embodiment in this paragraph wherein the yield of mesophase in the product is no more than about 0.5 wt % of the feed based on rotational polarized light microscopy. An embodiment is one, any or all of prior embodiments in this paragraph up through the first embodiment in this paragraph wherein the molybdenum is provided by molybdenum octanoate, molybdenum dithiocarbamate, phosphomolybdate, $MoO_3$, organic molybdenum, ammonium heptamolybdate or molybdenum sulfide and mixtures thereof. An embodiment is one, any or all of prior embodiments in this paragraph up through the first embodiment in this paragraph wherein the iron particles have mean particle diameters of less than 800 microns.

A second embodiment is a process for converting heavy hydrocarbon feed into lighter hydrocarbon products comprising mixing the heavy hydrocarbon liquid feed with oil soluble molybdenum, iron particles comprising aluminum and hydrogen to form a heavy hydrocarbon slurry comprising hydrocarbon liquid and catalyst particles; hydrocracking hydrocarbons in the heavy hydrocarbon slurry in the presence of hydrogen and catalyst in a hydrocracking reactor to produce a hydrocracked slurry product comprising lighter hydrocarbon products; and withdrawing the hydrocracked slurry product from the hydrocracking reactor. An embodiment is one, any or all of prior embodiments in this paragraph up through the second embodiment in this paragraph wherein the molybdenum is provided as molybdenum sulfide in the hydrocracking reactor. An embodiment is one, any or all of prior embodiments in this paragraph up through the second embodiment in this paragraph wherein the molybdenum in the catalyst is no more than about 200 wppm in the feed. An embodiment is one, any or all of prior embodiments in this paragraph up through the second embodiment in this paragraph wherein the iron in the iron particles is no more than about 0.7 wt % in the feed. An embodiment is one, any or all of prior embodiments in this paragraph up through the second embodiment in this paragraph wherein the aluminum in the iron particles is no more than about 0.7 wt % in the feed.

A third embodiment is a process for converting heavy hydrocarbon feed into lighter hydrocarbon products comprising mixing the heavy hydrocarbon liquid feed with oil soluble molybdenum, iron particles comprising mean particle diameters of no more than 800 microns and hydrogen to form a heavy hydrocarbon slurry comprising hydrocarbon liquid and catalyst particles; hydrocracking hydrocarbons in the heavy hydrocarbon slurry in the presence of hydrogen and catalyst in a hydrocracking reactor to produce a hydrocracked slurry product comprising lighter hydrocarbon products; and withdrawing the hydrocracked slurry product from the hydrocracking reactor. An embodiment is one, any or all of prior embodiments in this paragraph up through the third embodiment in this paragraph wherein the iron in the iron particles is no more than about 0.7 wt % in the feed.

Without further elaboration, it is believed that using the preceding description that one skilled in the art can utilize the present invention to its fullest extent and easily ascertain the essential characteristics of this invention, without departing from the spirit and scope thereof, to make various changes and modifications and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for converting heavy hydrocarbon feed into lighter hydrocarbon products comprising:
    mixing said heavy hydrocarbon liquid feed with oil soluble molybdenum, iron particles provided as bauxite, red mud, or laterite particles and hydrogen to form a heavy hydrocarbon slurry comprising hydrocarbon liquid and catalyst particles;
    hydrocracking hydrocarbons in said heavy hydrocarbon slurry at a pressure, in the range of 3.5 to 24 MPa in the presence of hydrogen and catalyst in a hydrocracking reactor to produce a hydrocracked slurry product comprising lighter hydrocarbon products; and
    withdrawing said hydrocracked slurry product from said hydrocracking reactor.

2. The process of claim 1 wherein the molybdenum is provided as molybdenum sulfide in the hydrocracking reactor.

3. The process of claim 1 wherein the molybdenum in the catalyst is no more than about 200 wppm in the feed.

4. The process of claim 1 wherein the iron in the iron particles is no more than about 0.7 wt % in the feed.

5. The process of claim 1 wherein the iron particles comprise aluminum and the aluminum in the iron particles is no more than about 0.7 wt % in the feed.

6. The process of claim 4 wherein the iron in the iron particles comprise no less than 0.4 wt % of the feed.

7. The process of claim 1 wherein the molybdenum is no more than about 175 wppm in the feed.

8. The process of claim 1 wherein the yield of TIOR in the product is no more than about 3.0 wt % of the feed.

9. The process of claim 1 wherein the yield of mesophase in the product is no more than about 0.5 wt % of the feed based on rotational polarized light microscopy.

10. The process of claim 1 wherein the molybdenum is provided by molybdenum octanoate, molybdenum dithiocarbamate, phosphomolybdate, $MoO_3$, organic molybdenum, ammonium heptamolybdate or molybdenum sulfide and mixtures thereof.

11. The process of claim 1 wherein the iron particles have mean particle diameters of less than 800 microns.

12. A process for converting heavy hydrocarbon feed into lighter hydrocarbon products comprising:
mixing said heavy hydrocarbon liquid feed with oil soluble molybdenum, iron particles comprising aluminum provided as bauxite, red mud, or laterite particles and hydrogen to form a heavy hydrocarbon slurry comprising hydrocarbon liquid and catalyst particles, wherein said oil soluble molybdenum and said iron particles are added separately to said heavy hydrocarbon liquid feed;
hydrocracking hydrocarbons in said heavy hydrocarbon slurry in the presence of hydrogen and catalyst in a hydrocracking reactor to produce a hydrocracked slurry product comprising lighter hydrocarbon products; and
withdrawing said hydrocracked slurry product from said hydrocracking reactor.

13. The process of claim 12 wherein the molybdenum is provided as molybdenum sulfide in the hydrocracking reactor.

14. The process of claim 12 wherein the molybdenum in the catalyst is no more than about 200 wppm in the feed.

15. The process of claim 12 wherein the iron in the iron particles is no more than about 0.7 wt % in the feed.

16. The process of claim 12 wherein the aluminum in the iron particles is no more than about 0.7 wt % in the feed.

17. A process for converting heavy hydrocarbon feed into lighter hydrocarbon products comprising:
mixing said heavy hydrocarbon liquid feed with oil soluble molybdenum, iron particles provided as bauxite, red mud, or laterite particles and comprising mean particle diameters of no more than 800 microns and hydrogen to form a heavy hydrocarbon slurry comprising hydrocarbon liquid and catalyst particles, wherein said oil soluble molybdenum and said iron particles are added separately to said heavy hydrocarbon liquid feed, wherein the iron in the iron particles is no more than about 0.7 wt % in the feed;
hydrocracking hydrocarbons in said heavy hydrocarbon slurry in the presence of hydrogen and catalyst in a hydrocracking reactor to produce a hydrocracked slurry product comprising lighter hydrocarbon products; and
withdrawing said hydrocracked slurry product from said hydrocracking reactor.

* * * * *